United States Patent
Morton (10) Patent No.: US 9,414,653 B1
(45) Date of Patent: Aug. 16, 2016

(54) RING CUTTING DEVICE AND METHOD

(71) Applicant: Steven D. Morton, South Jordan, UT (US)

(72) Inventor: Steven D. Morton, South Jordan, UT (US)

( * ) Notice: Subject to any disclaimer, the term of this patent is extended or adjusted under 35 U.S.C. 154(b) by 66 days.

(21) Appl. No.: 14/558,022

(22) Filed: Dec. 2, 2014

(51) Int. Cl.
*B23D 45/16* (2006.01)
*A44C 9/00* (2006.01)

(52) U.S. Cl.
CPC .............. *A44C 9/0084* (2013.01); *B23D 45/16* (2013.01)

(58) Field of Classification Search
CPC ............................ A44C 9/0084; B23D 45/16
USPC ........... 30/90.4, 90.8, 93, 94, 124, 374; 83/13
See application file for complete search history.

(56) References Cited

U.S. PATENT DOCUMENTS

| | | | | |
|---|---|---|---|---|
| 328,154 A * | 10/1885 | Thomas | ................... | B27B 5/184 30/276 |
| 653,557 A * | 7/1900 | Jenkins | ................... | B27B 5/184 30/276 |
| 1,867,342 A * | 7/1932 | Wieg | ....................... | B23D 45/16 29/229 |
| 2,851,862 A * | 9/1958 | Lohman | ............... | B23D 45/006 30/372 |
| 4,694,574 A * | 9/1987 | Dickinson | ............... | B23B 5/168 15/104.09 |
| 4,864,730 A | 9/1989 | Weiss | | |
| 4,976,034 A * | 12/1990 | Whitman | .............. | B23D 45/003 30/124 |
| 5,020,226 A * | 6/1991 | Chabbert | ................. | A61F 15/02 30/373 |
| D328,842 S * | 8/1992 | Whitman | ................. | A61F 15/02 D8/64 |
| 6,449,851 B1 * | 9/2002 | Bone | ..................... | B23D 51/046 269/237 |
| 6,578,267 B2 * | 6/2003 | Seyfer | .................... | B23D 45/12 30/124 |
| 6,925,917 B2 * | 8/2005 | Tilley | ................... | B23D 45/003 30/123.3 |
| 7,077,736 B2 * | 7/2006 | Uzumcu | ............... | B23D 47/126 451/358 |
| 7,310,879 B1 * | 12/2007 | Clarke | ................... | B23D 45/16 30/122 |
| 2003/0163924 A1 * | 9/2003 | Hempe | .................. | B23D 45/16 30/388 |
| 2005/0217452 A1 * | 10/2005 | McDonnell | ............ | B23D 45/16 83/663 |
| 2013/0318800 A1 * | 12/2013 | Weiss | ................... | B23D 45/003 30/370 |
| 2014/0000118 A1 * | 1/2014 | Chambers | .............. | B23D 47/12 30/388 |
| 2016/0016237 A1 * | 1/2016 | Sauer | ................... | B23D 45/006 83/23 |

OTHER PUBLICATIONS

Page from world wide web loupe-magnifier.com/snowdenposter2010.pdf.

* cited by examiner

*Primary Examiner* — Sean Michalski
(74) *Attorney, Agent, or Firm* — Brian C. Trask

(57) ABSTRACT

A specialized cutter adapted to remove a jewelry ring from a finger of a human hand. The cutter may include a diamond covered wheel having diamond grit sized between about 100-grit and about 170-grit. Preferably, the cutter can be assembled to permit either of a left-hand, or a right-hand mode of operation. Certain embodiments are structured to preclude relative motion between a cutting blade and the drive shaft on which it is mounted.

20 Claims, 7 Drawing Sheets

RING CUTTING DEVICE AND METHOD

BACKGROUND

1. Field of the Invention

This invention relates generally to saws and cutting devices. It is particularly directed to a cutter for removing an ornamental ring from a human finger.

2. State of the Art

Situations exist in which removing an ornamental jewelry ring from the finger on which it is worn requires cutting through at least one side, or wall, of the ring. For example, a ring that is too tight may cause a finger to swell to the point that the ring simply cannot be slid off in conventional fashion. Damage to a ring or finger (e.g. industrial accident), may also preclude conventional removal of a ring. In certain cases, a known ring cutter may be employed to cut through one side of the ring. Certain malleable rings (such as rings made from Copper, Gold, Silver, and other precious metals), may then be increased in diameter by prying the ring material apart in a circumferential direction. Sometimes, opposite sides of the ring must be cut through to enable removal of the ring from a finger.

Known ring cutter devices include a blade that is rotated while pressed into contact with a wall of the ring. A skin guard resists contact between the blade and tissue of the finger. Blades may be fashioned entirely from metal (similar to a metal hack saw blade), or may resemble grit-encrusted disks. At least one commercially available ring cutter employs a bushing formed between Stainless Steel and Brass in which to journal the cutting blade's axle.

It is known to include diamond particles in the grit coating of a diamond-coated blade. A best guess for grit size used in diamond-coated blades of a commercially available ring cutter is between about 235 and 600. As understood, the diamond particles are bonded to a substrate in a proprietary sintering process that allows for controlled bond erosion when grinding through materials. The ratio of diamond particles-to-matrix is believed to be about 60/40. Unfortunately, such commercially available diamond-coated blades wear out very quickly, must be operated at relatively low rpm (e.g. less than about 500 rpm), and generate significant amount of heat. The cutting surface of such a blade generates significant heat because the matrix and diamond particles form an essentially smooth surface, placing virtually the entire cutting surface in contact with the ring in a grinding zone.

In recent times, rings made from alternative materials have become popular. Rings made from materials such as Cobalt, Tungsten Carbide, Ceramic Carbide, Zirconium, and Titanium resist increasing in diameter subsequent to a single cut, and typically also require cutting through the opposite side of the ring to effect removal of the ring from a finger. The commercially available ring cutters either take too long to cut through such rings, or simply cannot perform that task. There have been situations wherein the time spent attempting to remove a ring caused the ring-decorated finger to die.

It would be an advance to provide a device, and method of use of that device, operable to remove difficult rings (e.g. made from certain non-traditional materials) from fingers in a medically effective time period. It would be a further improvement to provide a ring cutter that may be optionally operated in either one of a selected right-hand, or left-hand, mode.

BRIEF SUMMARY OF THE INVENTION

This invention provides a device particularly adapted for cutting a jewelry ring from a human finger. However, the device may be used for other purposes, for example: cutting through handcuffs. The device includes a handle structured to be grasped at a holding end by a single one of either a left, or a right, human stabilizing hand. The handle is affixed to a cutting assembly carried in a housing disposed at a distal end of the handle. The cutting assembly includes a blade carried by a drive shaft assembly. Typically, the blade is circular, and includes a circular cutting edge. The handle is generally manipulated to orient the cutting edge for perpendicular interaction with respect to the annular wall of a ring. In a preferred embodiment, the cutting edge comprises dispersed diamond particles sized between about 100-grit and about 170-grit.

The device generally also includes a skin guard with a distally-disposed clamp and a proximal actuator lever. A portion of the clamp is structured to fit in radial proximity to a portion of the cutting edge, and is configured and arranged to facilitate insertion of the clamp between a jewelry ring and a finger wearing that ring such that operation of the actuator lever by the stabilizing hand is effective to urge the clamp to carry a cross-section of the ring toward the cutting edge. A workable clamp portion is formed from Stainless Steel, and presents a Stainless Steel contact surface to the cutting edge when the ring is completely cut through.

Preferably, the drive shaft assembly is structured in harmony with the housing to permit assembly of the drive shaft assembly journaled in the housing to dispose a driven end of the drive shaft assembly at either of left hand, or right hand, operable positions and thereby optionally allow application of rotation to the drive shaft assembly from either the left side, or the right side, of the housing. A currently preferred housing provides a Stainless Steel journaling surface to receive the drive shaft assembly and a cooperating bearing surface of the drive shaft assembly is made from Stainless Steel such that a steel-on-steel interface is formed at the bearing surface therebetween.

The blade is typically removably affixable to the drive shaft assembly effective to dispose the blade at an operable position with respect to the housing. In certain cases, an interface between the blade and drive shaft assembly is configured to cause a circumferential structural interference capable of transmitting torque to the blade. In a preferred embodiment, the torque is limited only by: resistance to blade spin; power source applied to said drive shaft assembly; or structural failure of a constituent component. One exemplary structural interference is formed between a spud of the drive shaft assembly and a cooperating rectangular socket formed in the blade, the spud having a rectangular cross-section and being received inside the socket upon assembly of the blade onto the drive shaft. Sometimes, one end of the drive shaft assembly is structured to couple with a motor to receive automated cutting power input. Other times, one end of the drive shaft assembly is structured to receive manual cutting power input from a user's non-stabilizing hand.

A workable drive shaft assembly may include a driven axle and a slave axle. The slave axle may be affixed to the driven axle effective to capture and clamp a blade. In a preferred embodiment, one end of the driven axle carries structure configured to receive rotational input, the other end of the driven axle carries coupling structure for a blade and slave axle. Exemplary coupling structure includes a rectangular drive spud configured and arranged to dispose the drive spud inside a cooperating socket in a rim of the blade, and thereby cause a circumferential structural interference, upon assembly of the driven axle and slave axle to capture the blade. That coupling structure may further include a first shoulder carried by the driven axle to form a stop against one side of the housing subsequent to capture of the blade, and a second shoulder carried by the slave axle to form a stop against the other side of the housing subsequent to capture of the blade. The two opposed stop structures are then effective to maintain the blade at an operable position with respect to the housing.

Preferred devices according to the invention may be used in a method to remove a jewelry ring from a human finger. As a first step, the method includes providing a jewelry ring cutter of the type including stabilizing handle, for a circular cutting blade carried on a driveshaft that is journaled in a housing disposed at a distal end of the handle, and a skin guard operably associated with the cutting blade and including a clamp portion arranged to urge a cross-section of the ring toward the cutting blade. The user may then select a desired mode of either left- or right-hand operation of the ring cutter. If the ring cutter is not pre-configured as desired, the user may assemble the ring cutter to provide the desired mode of left- or right-hand operation. Then, the user may proceed with cutting the ring from the finger in accordance with the selected mode of left- or right-hand operation.

In one aspect of the invention, the step of assembling the ring cutter includes selecting a cutting blade having a cutting edge that carries diamond particles sized between about 100-grit and about 170-grit, and entrapping the cutting blade on the driveshaft to dispose the cutting blade in operable installed position with respect to the housing. Sometimes, the entrapping step includes creating a circumferentially-disposed structural interference between the drive shaft and blade. One operable circumferentially-disposed structural interference may be created by placing a rectangular cross-section of the drive shaft in penetrating registration in a cooperating rectangular socket in the blade.

Typically, the cutting step is performed with contact between the ring and cutting edge being disposed under, or in, a water bath or stream. That is, the cutting zone is generally bathed, or submerged, in water. Typically, the cutting step includes application of cutting pressure between the blade and ring by using a cutting hand to urge the axis of rotation of a source of cutting power toward the ring wall at the clamp portion while simultaneously using a stabilizing hand to apply clamping pressure between the clamp portion and blade. It is generally recommended for cutting of most rings to occur between about 200 rpm and about 1500 rpm, or so.

BRIEF DESCRIPTION OF THE DRAWINGS

In the drawings, which illustrate what are currently considered to be the best modes for carrying out the invention.

DETAILED DESCRIPTION OF THE ILLUSTRATED EMBODIMENT(S)

Reference will now be made to the drawings in which the various elements of the illustrated embodiments will be given numerical designations and in which the invention will be discussed so as to enable one skilled in the art to make and use the invention. It is to be understood that the following description is only exemplary of certain principles of the present invention, and should not be viewed as narrowing the claims which follow.

A first embodiment of a ring cutter, generally 100, structured according to certain principles of the invention is illustrated in FIGS. 1 through 4. Ring cutter 100 is particularly configured to facilitate cutting a jewelry ring from the finger of a human. An ambidextrous handle 104 extends proximally from a cutter assembly, generally 108. The proximal holding end 110 of handle 104 may be gripped in either the left hand, or the right hand, of a user. The hand that grasps the handle 104 is characterized as a stabilizing hand. In embodiment 100, the handle 104 is preferentially grasped by the user's right hand, and a source of rotation 112 is grasped in, and can be manipulated by, the user's left hand. As will be further detailed below, a source of rotation 112 may be mechanized, or manual.

Figure 1:
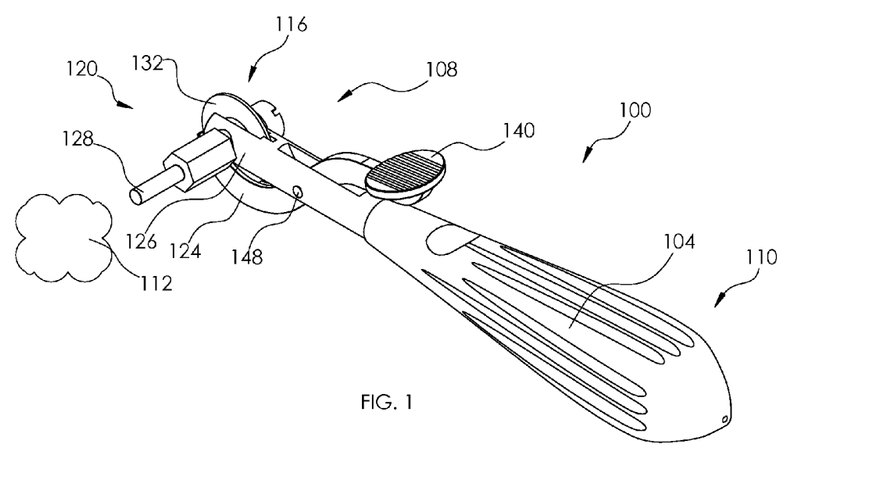
FIG. 1 is a view in perspective of an embodiment of a ring cutter structured according to certain principles of the invention and assembled to permit left-handed operation.
Figure 2:
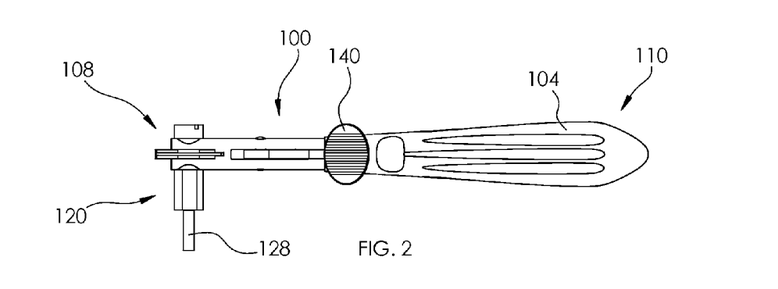
FIG. 2 is a top view of the embodiment in FIG. 1.

Cutter assembly 108 carried at distal end 116 of handle 104 includes a drive shaft assembly, generally 120, and a skin guard 124. As will be further detailed below, drive shaft assembly 120 is journaled for rotation in housing 126. Drive shaft assembly 120 includes an input shaft 128 structured to interface with a mechanized source of rotation 112 to provide cutting power to the blade 132. Operable sources of mechanized rotation 112 include various motors, such as an electric drill, or a rotary tool, such as a Dremmel™ tool or flexible shaft grinder, or an air-powered tool or drill. The currently preferred input shaft 128 is structured to be removably clamped in the chuck of a drill or rotary tool. A preferred input shaft 128 is embodied as a ⅛ inch diameter dowel. However, a workable input shaft may be embodied in any other shape that is conveniently received in the jaws of a chuck. It is within contemplation that a source of rotation may alternatively be permanently affixed to an input shaft.

A clamp, generally 136 (FIG. 3), is formed at a distal end of skin guard 124. A proximal portion of the skin guard 124 provides an actuator lever 140. A user's stabilizing hand can operate the lever 140 to urge clamp 136 toward the cutting edge 144 of blade 132. Clamp 136 is structured to fit in radial proximity to a portion of cutting edge 144, and is arranged to facilitate insertion between a jewelry ring and a finger wearing that ring such that operation of actuator lever 140 by the stabilizing hand is effective to urge clamp 136 to carry a cross-section of the ring toward the cutting edge 144.

Figures 3, 4:
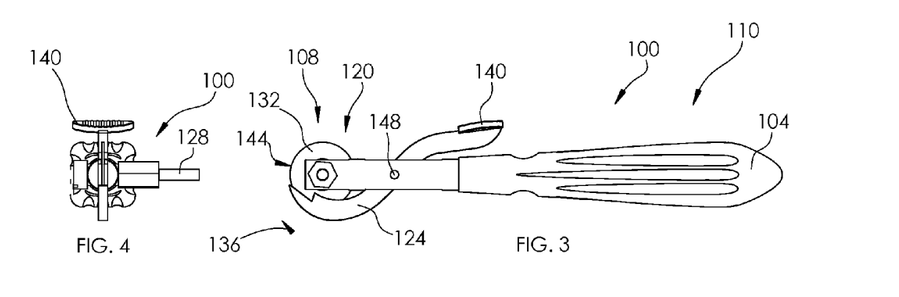
FIG. 3 is a side view of the embodiment in FIG. 1.
FIG. 4 is a distal end view of the embodiment in FIG. 1.

Although more elaborate mechanisms may be envisioned, a simple scissors mechanism including pivot 148 is sufficient to form a workable clamp 136.

Figure 5:
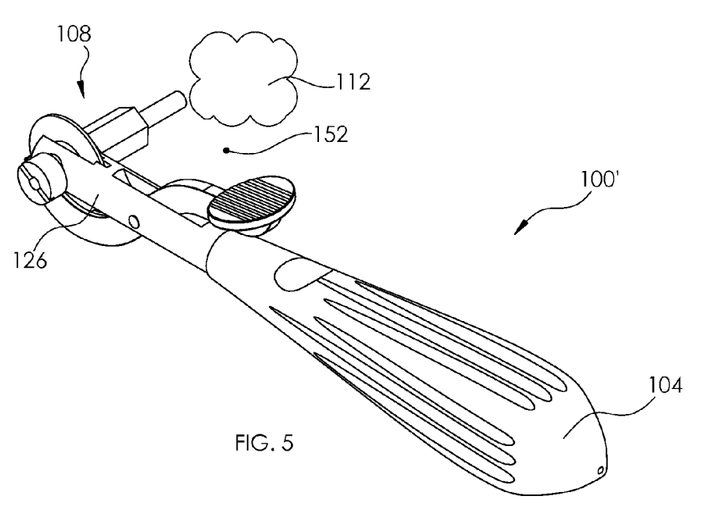
FIG. 5 is an embodiment assembled to permit right-handed operation.
Figures 6, 7:
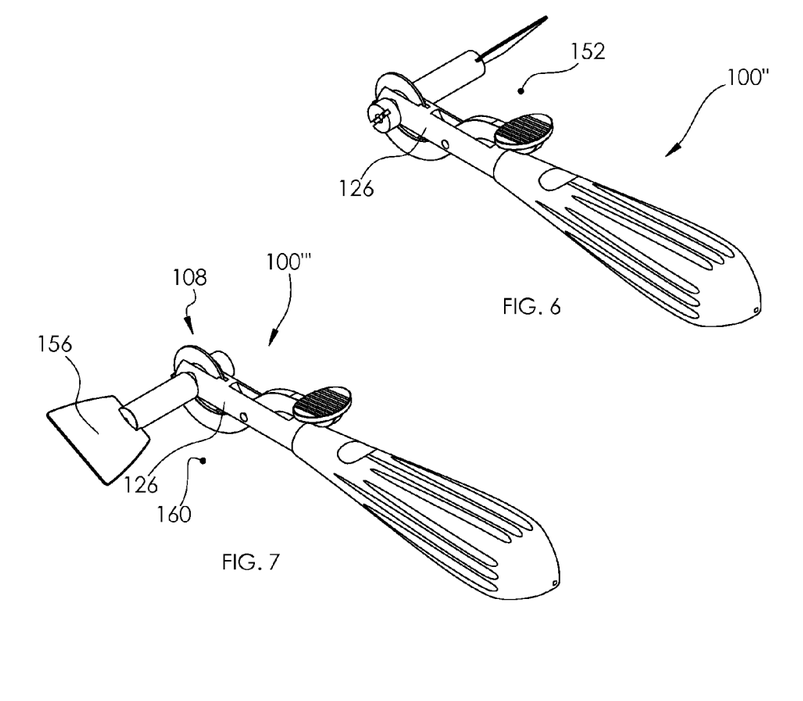
FIG. 6 is an embodiment assembled to permit right-handed manual operation.
FIG. 7 is an embodiment assembled to permit left-handed manual operation.
Figure 8:
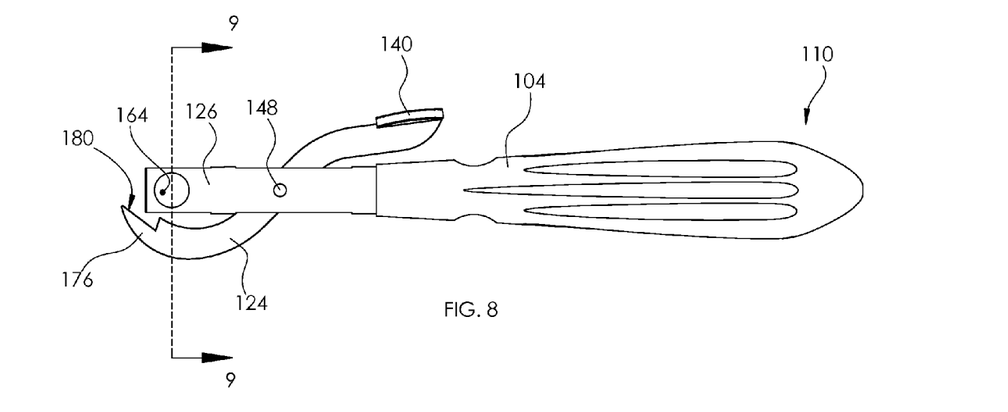
FIG. 8 is a side view of an operable handle and skin guard.
Figure 9:
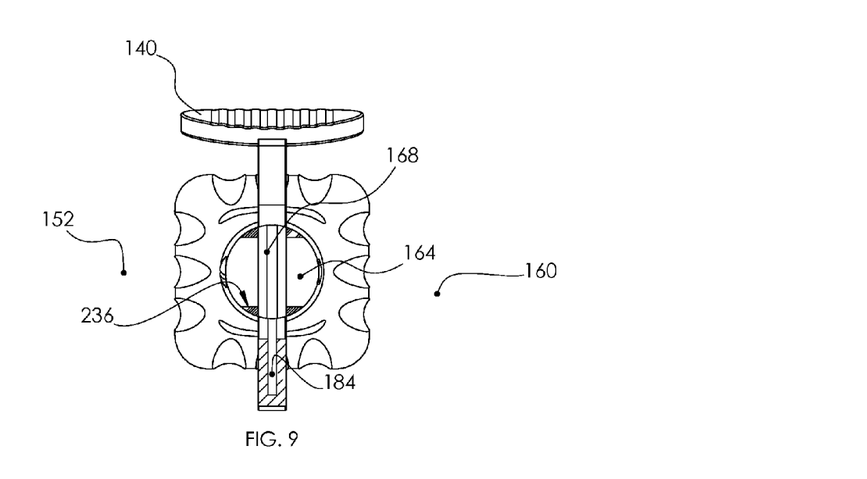
FIG. 9 is a cross-section view taken at section 9-9 in FIG. 8 and looking in the direction of the arrows.
Figure 10:
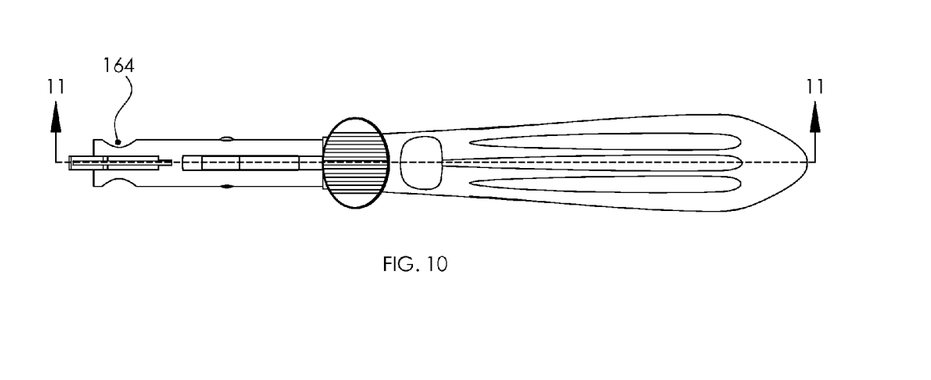
FIG. 10 is a top view of the embodiment in FIG. 8.
Figure 11:
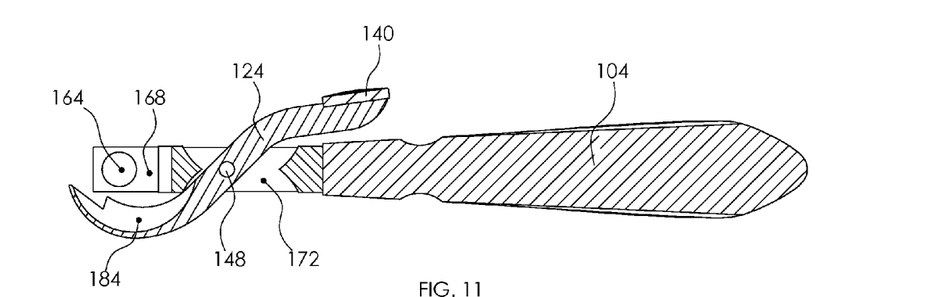
FIG. 11 is a cross-section view taken at section 11-11 in FIG. 10, and looking in the direction of the arrows.

The definition for mode or "handedness" of operation is based on a presumed manual operation of the ring cutter assembly 108. Ring cutter 100 is made reference to as being configured for left-handed operation. Note that in FIG. 1, source of rotation 112 is applied to cutter assembly 108 on the left side of housing 126. Preferred embodiments of ring cutters may be easily converted from left-hand operation to right-hand operation. The embodiment 100' illustrated in FIG. 5 is characterized as being configured for right-hand operation. That is, the source of rotation 112 is applied to cutter assembly 108 of ring cutter 100' on the right side 152 of housing 126. Similarly, the manually operated embodiment 100'' illustrated in FIG. 6 is characterized as being configured for right-hand operation. Embodiment 100'' can be converted from right-hand operation to left-hand operation, as illustrated at 100''' in FIG. 7. With embodiment 100''' in FIG. 7, thumb paddle 156 is twisted manually to apply rotation to cutter assembly 108 from the left side 160 of housing 126.

FIGS. 8-11 illustrate certain details of a currently preferred handle 104 and skin guard 124. A through-bore 164 in housing 126 provides a female bearing in which to receive cooperating portions of drive shaft assembly 120. A vertical slot 168 is provided in housing 126 in which to receive a circular cutting blade 132. Although not required, a symmetrical aperture 172 is provided in handle 104 to permit attaching skin guard 124 at pivot 148 with actuator lever 140 projecting from either top or bottom of the handle. The latter arrangement simplifies manufacturing and assembly. Desirably, a finger 176 is provided and configured for insertion between a ring and the skin of the finger on which the ring is worn. A transport surface 180 is structured to carry the wall of the ring toward a cutting edge of blade 132. A channel 184 may be provided in skin guard 124 to further isolate a blade 132 from contact with skin of a patient.

FIGS. 12-15 illustrate certain details of construction for preferred drive shaft assemblies 120' and 120, respectively. Exemplary drive shaft assembly 120' is adapted for manual operation, and exemplary drive shaft assembly 120 is adapted for mechanized operation. Both of assembly 120 and 120' may be assembled in registration in a handle 104 as desired for left-hand, or right-hand modes of operation of a ring cutting device.

Figure 12:
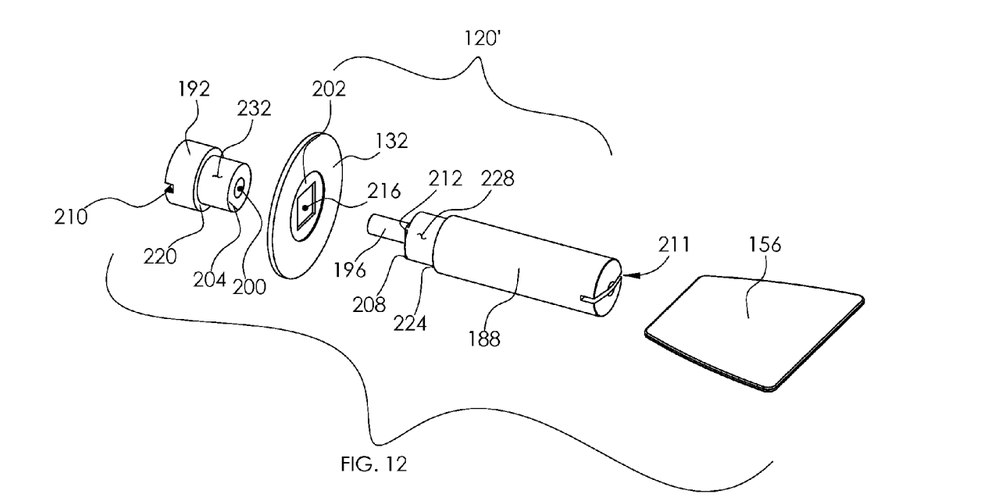
FIG. 12 is an exploded assembly view in perspective of a workable manually-operated drive shaft assembly.
Figure 13:
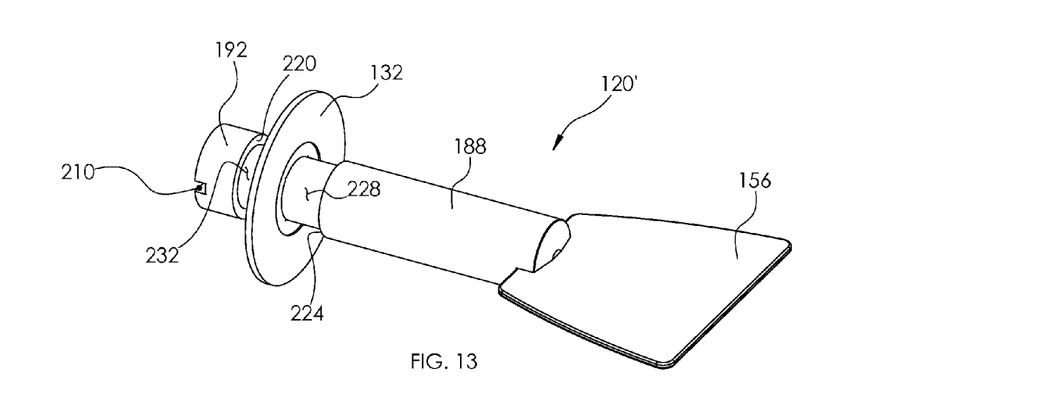
FIG. 13 is a view in perspective of the embodiment in FIG. 12.
Figure 14:
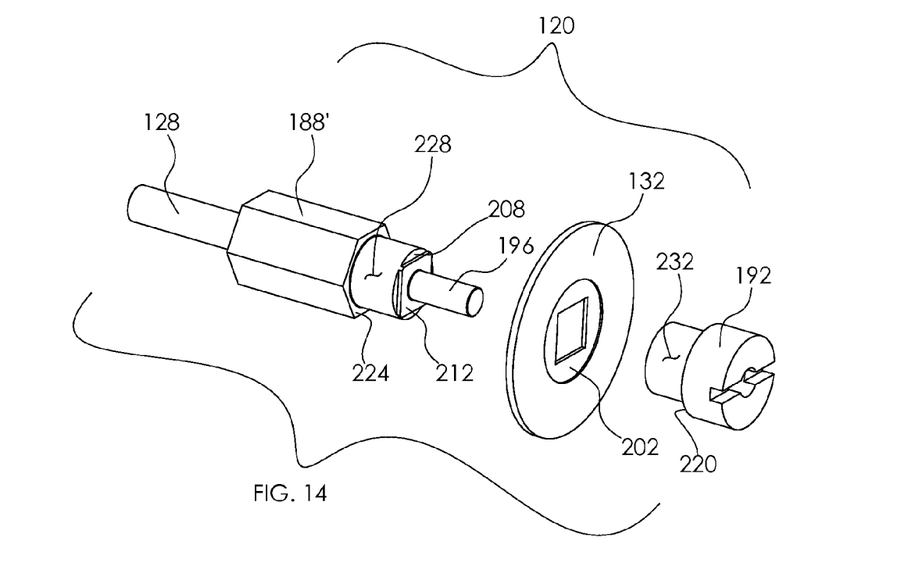
FIG. 14 is an exploded assembly view in perspective of an operable drive shaft assembly.
Figure 15:
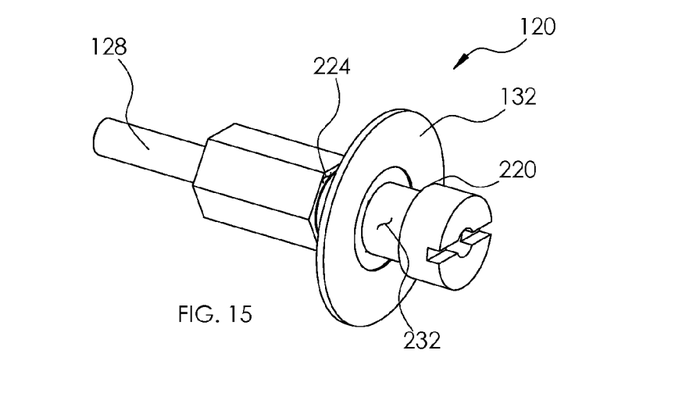
FIG. 15 is a view in perspective of the embodiment in FIG. 14.

With particular reference now to FIG. 12, drive shaft assembly 120' includes a driven axle 188 and a slave axle 192. In the illustrated arrangement, a threaded male member 196 is received in socket 200 to couple rotation of the slave axle 192 to rotation of driven axle 188. Assembly of slave axle 192 onto driven axle 188 is desirably also effective to clamp a rim 202 of blade 132 between shoulder 204 and shoulder 208. Alternative workable arrangements to couple a slave axle to a driven axle and simultaneously clamp a blade at an installed position will readily occur to one of ordinary skill.

Desirably, structure is provided to resist relative rotation of a blade 132 and driven axle 188. Solely a clamping force generated on rim 202 between shoulders 204 and 208 may be sufficient for certain ring cutting applications. A tool, such as a screw driver, can be applied to slot 210 and used in conjunction with thumb paddle 156 to variously clamp and release a blade 132. Thumb paddle 156 is typically affixed to manually driven axle 188 in accordance with known manufacturing techniques. One operable connection between a thumb paddle and a driven axle includes affixing paddle 156 into slot 211, which may be effected by silver soldering, or other known manufacturing technique. It is within contemplation that a thumb paddle-like structure may also be provided on slave axle 192 to avoid requirement of auxiliary hand tools to assemble a drive shaft assembly 120.

In addition to clamping a blade 132, it is preferred to also provide structure that causes a circumferential structural interference between a drive shaft and the blade 132. With reference to FIG. 12, one exemplary such arrangement includes drive spud 212 that is received in cooperating socket 216. Illustrated drive spud 212 is rectangular (see also FIG. 14), but any other shape capable of causing a circumferential interference with cooperating structure of a blade 132 is operable. The circumferential structural interference formed between spud 212 and socket 216 permits substantial torque to be transmitted from e.g. manually driven axle 188 (or e.g. mechanized driven axle 188', FIG. 14) to a blade 132, with the torque being limited only by: resistance to blade spin; limits of the power source applied to a drive shaft assembly; or structural failure of a constituent component.

Assembly of drive shaft assembly 120 for a selected mode of operation will now be explained with particular reference to FIGS. 1, 8, 9, 12, and 14. A blade 132 is positioned in registration in slot 168, and a driven axle 188 (or 188') is inserted into through-bore 164 to engage the blade socket 216 and capture the blade 132. The driven axle may be inserted from either the left side 160, or the right side 152, depending upon desired mode of operation. A slave axle 192 passing into through-bore 164 from the opposite side of housing 126 is affixed to the driven axle to clamp the blade rim 202 between shoulders 204 and 208. Shoulders 220 and 224 are then disposed on opposite sides of housing 126, and are typically arranged to assist in maintaining blade 132 operably centered in the slot 168. Each of the shoulders 220, 224 forms a stop against one side of the housing 126 subsequent to capture of a blade. On assembly of the drive shaft assembly 120, bearing surfaces 228 and 232 are operably journaled within cooperating female bearing surfaces 236 defined by through-bore 164. It is currently preferred to provide a relatively loose fit between cooperating bearing surfaces, to facilitate fluid flow through, and lubrication of, the interface there-between.

An exemplary cutting blade, generally indicated at 132, is illustrated in FIGS. 16-19. The currently preferred blade 132 includes a Stainless Steel rim 202 that projects radially into, and carries, a covering 240 of grit particles 244 affixed to the rim 202 by way of some sort of matrix 248. An operable blade 132 has a diameter D of about 0.8 inches, and a thickness T of about 0.030 inches. A workable aperture or socket 216 has a height H of about 0.2 inches, and a width W of about 0.2 inches.

Figures 16, 19:
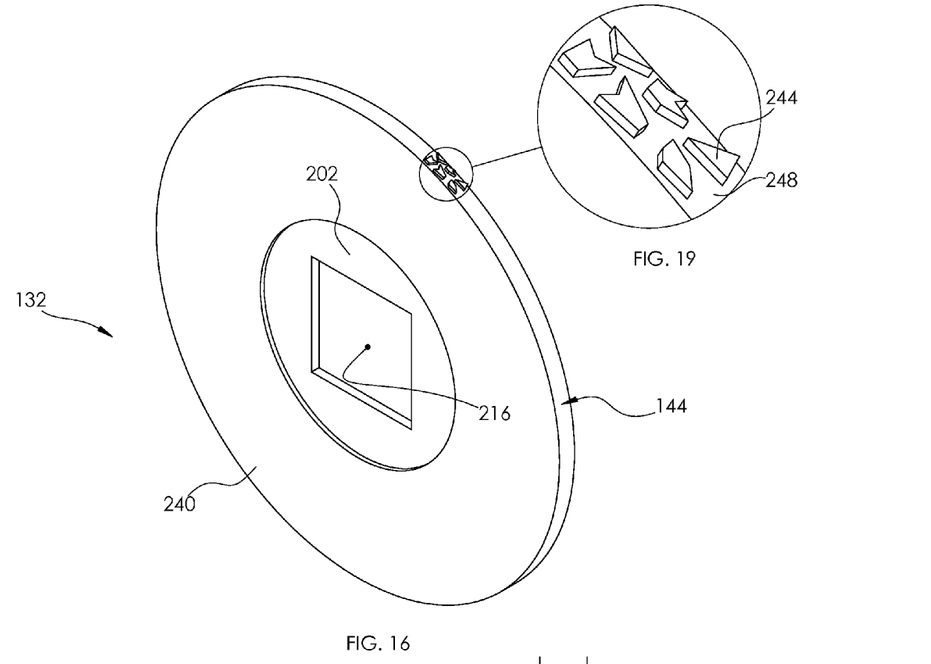
FIG. 16 is a view in perspective of an exemplary cutting blade.
FIG. 19 is a close-up view of a portion of the embodiment in FIG. 16.
Figure 17:
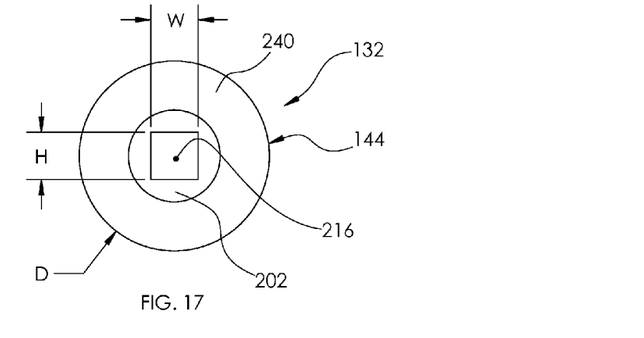
FIG. 17 is a side view of the embodiment in FIG. 16.
Figure 18:
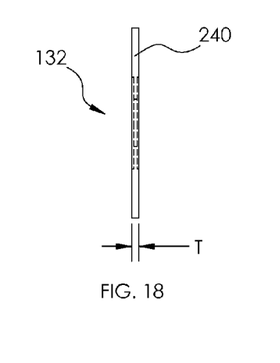
FIG. 18 is an end view of the embodiment in FIG. 16.

The currently preferred blade 132 includes a covering 240 of Nickel-bonded industrial diamond particles. Blades of this type are available from various manufacturers, including P. R. Diamond in Las Vegas, Nev., and UKAM Industrial Superhard Tools in Valencia, Calif. The preferred percentage ratio of diamond particles-to-Nickel-bond is believed to be about 80/20. Preferably, the blade coating is specified as being between about 110 to 140 grit (e.g. on a USA grit size scale with mesh, or wires per inch in a screen mesh). Note that a product specified as "being" 140 grit may include smaller grit particles in a range down to about 170 grit, depending upon size-range tolerance of a particular manufacturer.

It is difficult to distinguish the currently preferred blade 132 from commercially available diamond-covered blades merely by touch. However, it is believed that the larger grit size of preferred blades 132, compared to commercially available blades, unexpectedly changes the material removal from a grinding to a cutting (or perhaps machining) behavior. It is believed that less heat is generated due to larger grit particles causing a spacing of intervening portions of the cutting edge away from the ring material in a cutting (or perhaps machining) zone. As seen in Table 1 below, the speed of material removal is unexpectedly much faster with preferred blades 132 compared to data extracted from video information obtained from the internet.

TABLE 1

| Ring material | Moh's scale hardness | Time to cut twice with improved blade | Time to cut once with commercially available blade |
|---|---|---|---|
| Tungsten carbide | 9 | 1 min. 54 sec. | |
| Ceramic carbide | 9 | 1 min. 45 sec. | |
| Cobalt | 8.2 | 1 min. 30 sec. | >5 min |
| Zirconium | 7.5 | 1 min. 30 sec. | |
| Titanium | 6.3 | 56 sec. | |
| Precious metals | | 50 sec. | |

It is currently preferred to manufacture the drive shaft assembly 120, and also the housing 126, skin guard 124, and blade rim 202, from Stainless Steel. The preferred arrangement causes an operable loose journaled fit steel-on-steel bushing bearing interface. In the preferred embodiment, an operable material of construction for a ring cutter 100 includes 316 surgical grade Stainless Steel. However, it is recognized that constituent components can be made from other materials without departing from the spirit of the invention. It is further within contemplation that rolling bearing elements, or bushings and drive shafts made from different materials, can be employed as alternative structures operable to journal the drive shaft of a cutter blade 132.

Preferred devices according to the invention may be used in a method to remove a jewelry ring from a human finger. As a first step, the method includes providing a jewelry ring cutter of the type including stabilizing handle, for a circular cutting blade carried on a driveshaft that is journaled in a housing disposed at a distal end of the handle, and a skin guard operably associated with the cutting blade and including a clamp portion arranged to urge a cross-section of the ring toward the cutting blade. The user may then select a desired mode of either left- or right-hand operation of the ring cutter. If the ring cutter is not pre-configured as desired, the user may assemble the ring cutter to provide the desired mode of left- or right-hand operation. Then, the user may proceed with cutting the ring from the finger in accordance with the selected mode of left- or right-hand operation.

In one aspect of the invention, the step of assembling the ring cutter includes selecting a cutting blade having a cutting edge that carries diamond particles sized between about 100-grit and about 170-grit, and entrapping the cutting blade on the driveshaft to dispose the cutting blade in operable installed position with respect to the housing. Sometimes, the entrapping step includes creating a circumferentially-disposed structural interference between the drive shaft and blade. One operable circumferentially-disposed structural interference may be created by placing a rectangular cross-section of the drive shaft in penetrating registration in a cooperating rectangular socket in the blade.

The blade can be rotated by hand, or with a power assist, such as an electric motor. Typically, the electric motor is held in the non-stabilizing hand, and the stabilizing hand is used primarily to orient the blade perpendicular to the ring. The clamp feature has been found less effective to apply pressure between blade and ring than simply applying pressure to the motor. The clamp is more useful to maintain the blade in a desired cutting position. The combination of pressure from the clamp and directly from the cutting rotation source has been determined to be most effective for cutting. When the ring is cut though, a change in sound provides feedback to a user, and the cutting action can be terminated before the skin guard is also cut through.

Typically, the cutting step is performed with contact between the ring and cutting edge being disposed under, or in, a water bath or stream. That is, the cutting zone is generally bathed, or submerged, in water. The cutting step includes application of cutting pressure between the blade and ring by using a cutting hand to urge the axis of rotation of a source of cutting power toward the clamp portion while simultaneously using a stabilizing hand to apply clamping pressure between the clamp portion and blade. It is generally recommended for cutting of most rings to occur between about 200 rpm and about 1500 rpm, or so.

While the invention has been described in particular with reference to certain illustrated embodiments, such is not intended to limit the scope of the invention. The present invention may be embodied in other specific forms without departing from its spirit or essential characteristics. The described embodiments are to be considered as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
  a handle structured to be grasped at a holding end by a single one of either a left, or a right, human stabilizing hand;
  a cutting assembly carried in a housing at a distal end of said handle, said cutting assembly comprising a blade carried by a drive shaft assembly, said blade comprising a circular cutting edge;
  a skin guard comprising a distally-disposed clamp and a proximal actuator lever, a portion of said clamp being structured to fit in radial proximity to a portion of said cutting edge, said skin guard being configured and arranged to facilitate insertion of said clamp between a jewelry ring and a finger wearing that ring such that operation of said actuator lever by said stabilizing hand is effective to urge said clamp to carry a cross-section of said ring toward said cutting edge; wherein
  said drive shaft assembly is structured in harmony with said housing to permit assembly of said drive shaft assembly journaled in said housing to dispose a driven end of said drive shaft assembly at either of left hand, or right hand, operable positions and thereby optionally allow application of rotation to said drive shaft assembly from either the left side, or the right side, of said housing.

2. The apparatus according to claim 1, wherein:
  said blade is removably affixable to said drive shaft assembly effective to dispose said blade at an operable position with respect to said housing.

3. The apparatus according to claim 2, wherein:
  an interface between said blade and said drive shaft assembly is configured to cause a circumferential structural interference capable of transmitting torque to said blade, said torque being limited only by:
  resistance to blade spin;
  power source applied to said drive shaft assembly; or
  structural failure of a constituent component.

4. The apparatus according to claim 3, wherein:
  said structural interference is formed between a spud of said drive shaft assembly and a cooperating rectangular socket formed in said blade, said spud having a rectangular cross-section and being received inside said socket.

5. The apparatus according to claim 1, wherein:
one end of said drive shaft assembly is structured to couple with a motor to receive automated cutting power input.

6. The apparatus according to claim 1, wherein:
one end of said drive shaft assembly is structured to receive manual cutting power input from a user's non-stabilizing hand.

7. The apparatus according to claim 1, wherein:
said housing provides a Stainless Steel journaling surface to receive said drive shaft assembly and a cooperating bearing surface of said drive shaft assembly is made from Stainless Steel such that a steel-on-steel interface is formed at the bearing surface there-between.

8. The apparatus according to claim 1, wherein:
said cutting edge comprises dispersed diamond particles sized between about 100-grit and about 170-grit.

9. The apparatus according to claim 1, wherein:
said clamp portion is formed from Stainless Steel, and presents a Stainless Steel contact surface to said cutting edge when said ring is completely cut through.

10. The apparatus according to claim 2, wherein said drive shaft assembly comprises:
a driven axle and a slave axle that may be affixed to said driven axle effective to capture and clamp a blade, one end of said driven axle carrying structure configured to receive rotational input, the other end of said driven axle carrying coupling structure comprising a rectangular drive spud configured and arranged to dispose said drive spud inside a cooperating socket in a rim of said blade, and thereby cause a circumferential structural interference, upon assembly of said driven axle and said slave axle to capture said blade;
a first shoulder carried by said driven axle and configured to form a stop against one side of said housing subsequent to capture of said blade; and
a second shoulder carried by said slave axle and configured to form a stop against the other side of said housing subsequent to capture of said blade.

11. In a jewelry ring cutter of the type including a stabilizing handle for a circular cutting blade carried on a drive shaft assembly that is journaled in a housing and a skin guard operably associated with the blade and including a clamp portion arranged to urge a cross-section of the jewelry ring toward the cutting blade, the improvement comprising:
a cutting edge of said blade comprising distributed diamond particles sized between about 100-grit and about 170-grit.

12. The apparatus according to claim 11, wherein:
said drive shaft assembly is structured in harmony with said housing to permit assembly of said drive shaft assembly in penetration through said housing to dispose one end of said drive shaft assembly at either of left hand, or right hand, ambidextrously operable positions and thereby optionally allow application of rotation to said drive shaft assembly from either the left end, or the right end, of an installed drive shaft assembly.

13. The apparatus according to claim 12, wherein:
said housing provides a Stainless Steel journaling surface for said drive shaft assembly, and a cooperating bearing surface of said drive shaft assembly is made from Stainless Steel.

14. The apparatus according to claim 13, wherein said drive shaft assembly comprises:
a driven axle and a slave axle that may be affixed to said driven axle effective to capture and clamp a blade, one end of said driven axle carrying structure configured to receive rotational input, the other end of said driven axle carrying coupling structure comprising a rectangular drive spud configured and arranged to dispose said drive spud inside a cooperating socket in a rim of said blade, and thereby cause a circumferential structural interference, upon assembly of said driven axle and said slave axle to capture said blade;
a first shoulder carried by said driven axle and configured to form a stop against one side of said housing subsequent to capture of said blade; and
a second shoulder carried by said slave axle and configured to form a stop against the other side of said housing subsequent to capture of said blade.

15. A method to remove a jewelry ring from a human finger, comprising:
providing a jewelry ring cutter of the type including stabilizing handle, for a circular cutting blade carried on a drive shaft that is journaled in a housing disposed at a distal end of said handle, and a skin guard operably associated with said cutting blade and including a clamp portion arranged to urge a cross-section of said ring toward said cutting blade;
selecting a desired mode of either left- or right-hand operation of said ring cutter;
assembling said ring cutter to provide the desired mode of left- or right-hand operation; and
cutting the ring from the finger in accordance with the selected mode of left- or right-hand operation.

16. The method according to claim 15, wherein:
said step of assembling said ring cutter comprises selecting a cutting blade having a cutting edge that carries diamond particles sized between about 100-grit and about 170-grit, and entrapping said cutting blade on said driveshaft to dispose said cutting blade in operable installed position with respect to said housing.

17. The method according to claim 15, wherein:
said entrapping step comprises creating a circumferentially-disposed structural interference between said drive shaft and said blade.

18. The method according to claim 17, wherein:
creating said circumferentially-disposed structural interference comprises placing a rectangular cross-section of said drive shaft in penetrating registration in a cooperating rectangular socket in said blade.

19. The method according to claim 15, wherein:
said cutting step is performed with contact between said ring and said cutting edge disposed under a water bath.

20. The method according to claim 15, wherein:
said cutting step comprises application of cutting pressure between said blade and said ring by using a cutting hand to urge the axis of rotation of a source of cutting power toward said clamp portion while simultaneously using a stabilizing hand to apply clamping pressure between said clamp portion and said blade.

* * * * *